No. 686,969. Patented Nov. 19, 1901.
C. H. HOFMEISTER.
CAR FENDER.
(Application filed July 27, 1901.)

(No Model.)

Witnesses:
Alfred O. Eicker
J. Mill Rippey

Inventor
Chas. H. Hofmeister
By Higdon & Longan attys

THE NORRIS PETERS CO., PHOTO-LITHO., WASHINGTON, D. C.

UNITED STATES PATENT OFFICE.

CHARLES H. HOFMEISTER, OF ST. LOUIS, MISSOURI, ASSIGNOR OF ONE-HALF TO MICHAEL M. SUTTER AND HENRY J. BRAUN, OF ST. LOUIS, MISSOURI.

CAR-FENDER.

SPECIFICATION forming part of Letters Patent No. 686,969, dated November 19, 1901.

Application filed July 27, 1901. Serial No. 69,984. (No model.)

*To all whom it may concern:*

Be it known that I, CHARLES H. HOFMEISTER, of the city of St. Louis, State of Missouri, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

Figure 1:
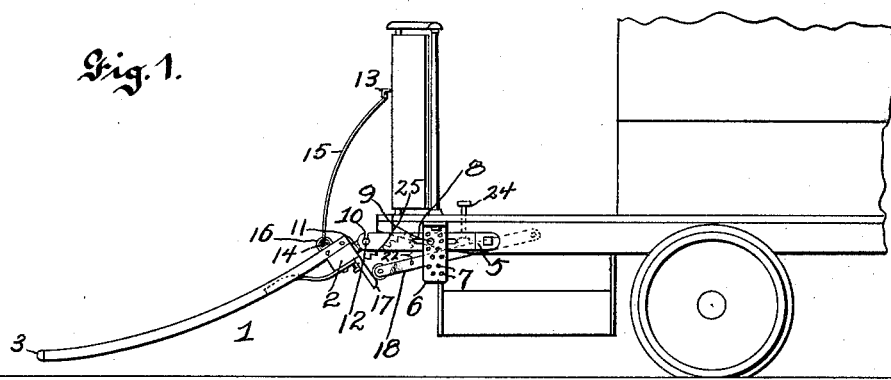
Figure 2:
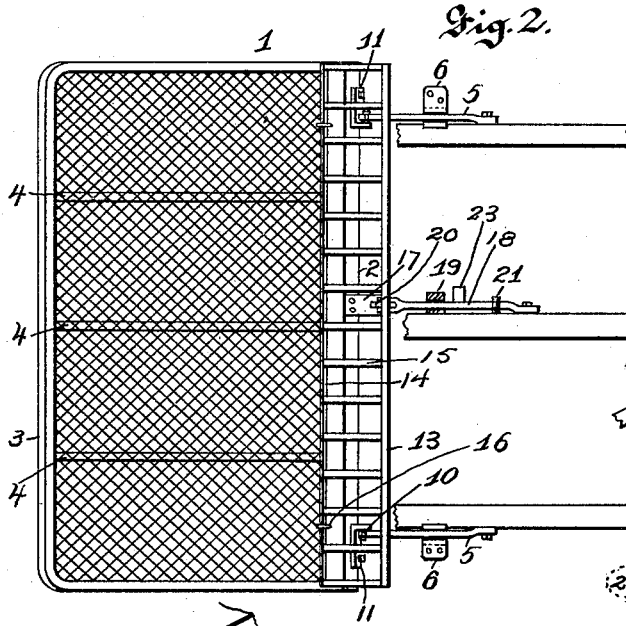
Figure 3:
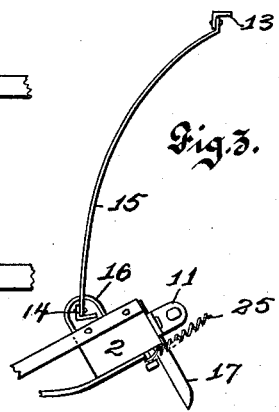
Figures 4, 5:
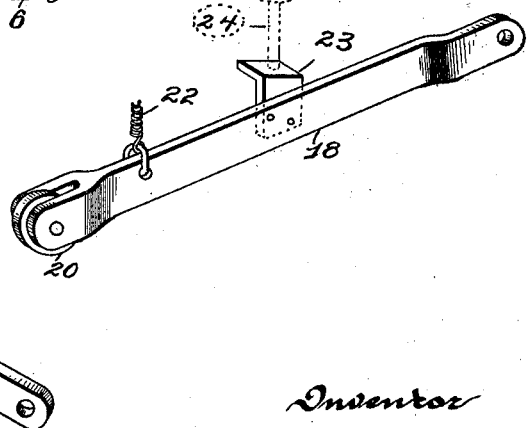

Figure 1 is a view of a fender applied to a car. Fig. 2 is a plan view of the fender, showing the connections by which it is upheld. Fig. 3 is an enlarged view of a portion of the rear end of the fender. Fig. 4 is a perspective view of one of the arms to which the fender is connected. Fig. 5 is a perspective view of the devices by which the fender is upheld and which are operated to release the fender so that it may drop to the track.

In the construction of my improved fender I provide a frame 1, preferably constructed of angle-iron, except the rear sides 2 of the said frame, which are of wood. The forward end of the fender carries a covering 3 of some soft material to avoid causing injury to any objects with which the fender may come in contact. The frame is strengthened by the strips 4, fixed at intervals between the front and rear ends of the fender.

5 indicates a number of arms which are pivoted, preferably, to the sills of the car, but may be pivoted to any other parts. Only the rear ends of the said arms are connected to the timbers of the car, and they operate within the U-shaped brackets 6, connected in any suitable manner to the under side of the car and provided with the openings 7, adapted to receive pins or bolts for holding the arms 5 in different positions. Each of the said arms 5 is provided with a longitudinal slot 8, adapted to receive the pins 9, which are passed through the opening 7 and through the said slots 8, thereby holding the arms 5 in any position in which they may be placed. The forward end of each of the arms 5 is provided with a notch 10, which notches are slightly enlarged at their lower ends.

Brackets 11 are secured to the rear end 2 of the fender, and each of the said brackets carries a pin 12, the upper and lower sides of which are flattened, as shown in Fig. 4. The said pins 12 are inserted within the notches 10 by turning the fender into a vertical position and passing the pins downwardly within the notches until they reach the enlarged parts thereof, when the fender can turn into the position shown in Fig. 1. This will prevent the fender from being accidentally displaced. The said pins 12 serve as pivots or hinges, so that the fender may be raised or lowered as required for its effective operation. I also provide suitable means for holding the objects which are picked up by the fender out of contact with the end of the car. I provide the upper cross-piece 13 and the lower cross-piece 14, both preferably constructed of angle-iron, as clearly shown in Fig. 3, and the said parts are connected by the curved spring-plates 15, which are adapted to receive the impact of the object to hold it out of contact with the car. The staples 16 are connected to the rear end of the fender and inclose the cross-piece 14, thereby holding this part of the fender in position. The said staples 16 also serve as hinges, so that the two parts of the fender may be turned together or into different positions than those shown.

17 indicates an arm which is connected to the rear end 2 of the fender and extends downwardly therefrom. An arm 18 is pivoted to the central sill of the car and operates within the guide-bracket 19, and the forward end of the said fender carries a small wheel or roller 20, which operates upon the arm 17. The said arm 18 is prevented from too far upward movement by the pin or projection 21, which is connected to some part of the car-frame and extends over the said arm. The spring 22 has its lower end connected to the arm 18 and its upper end attached to some part of the car and serves to draw the arm 18 upwardly and restore it to its normal position after it has been operated to release the fender. An angle-bracket 23 is carried by the arm 18, and a pin 24, located within an opening in the car-bottom, has its lower end resting upon the said bracket and affords means for lowering the arm 18 to release the fender, which is done by forcing the said arm 18 downwardly until its forward end has passed beyond the lower end of the arm 17, after which the fender can drop to the track, assisted by the tension of the spring 25, connected thereto and to the car in any known manner.

In operation the fender is mounted as described, with the pins 12 located in the notches 10 and the arms 15 substantially vertical, with the angle-iron 13 resting against the dashboard of the car. The forward end of the arm 18, carrying the wheel or roller 20, is located, as shown in Fig. 1, against the rear side of the arm 17, thereby holding the fender in an elevated position, the pin 21 preventing the said arm 18 from being raised by the weight of the fender. To lower the fender, the pin 24 is forced downwardly, which moves the arm 18 in opposition to the spring 22 and releases the forward end of the said arm from the arm 17, after which the fender can drop to the track. The rear end of the fender can be raised and lowered into different positions by adjusting the pins 9 in the openings 7 in the brackets 6. The slots 8 are elongated for the purpose of receiving the pins in whatever positions the arms 5 may be placed.

I claim—

1. A fender, consisting of a frame, arms pivoted to the frame of the car for supporting the fender, brackets for holding the said arms in position, means for adjusting the said arms at different elevations within said brackets, an arm carried by the car and adapted to engage against the rear end of the fender and thereby hold the latter in an elevated position, and means for operating the arm to release the fender, substantially as specified.

2. A fender, consisting of a frame, arms pivotally carried by the car and adapted to support the fender, brackets for holding said arms in position, means for adjusting the said arms at different elevations within the brackets, an arm carried by the rear end of the fender, an arm 18 pivoted to the under side of the car and adapted to engage against the arm carried by the rear end of the fender and thereby hold the latter in an elevated position, and means for operating the said arm 18 to release the fender so that it can drop to the track, substantially as specified.

3. A car-fender, consisting of a suitable frame, arms carried by the car-body for supporting the fender, means for adjusting the said arms at different elevations, an arm carried by the rear end of the fender, an arm 18 carried by the car-body and adapted to engage against the arm carried by the rear end of the fender and thereby hold the fender in an elevated position, means for operating said arm 18 to disengage it from the arm carried by the fender, and a series of spring-plates 15 supported by the rear end of the fender and extending upwardly therefrom, substantially as specified.

In testimony whereof I affix my signature in presence of two witnesses.

CHARLES H. HOFMEISTER.

Witnesses:
EDWARD E. LONGAN,
ALFRED A. EICKS.